April 28, 1925.  1,535,639
C. A. M. WEBER
MEANS FOR OVERCOMING LOAD INERTIA
Filed Sept. 16, 1918
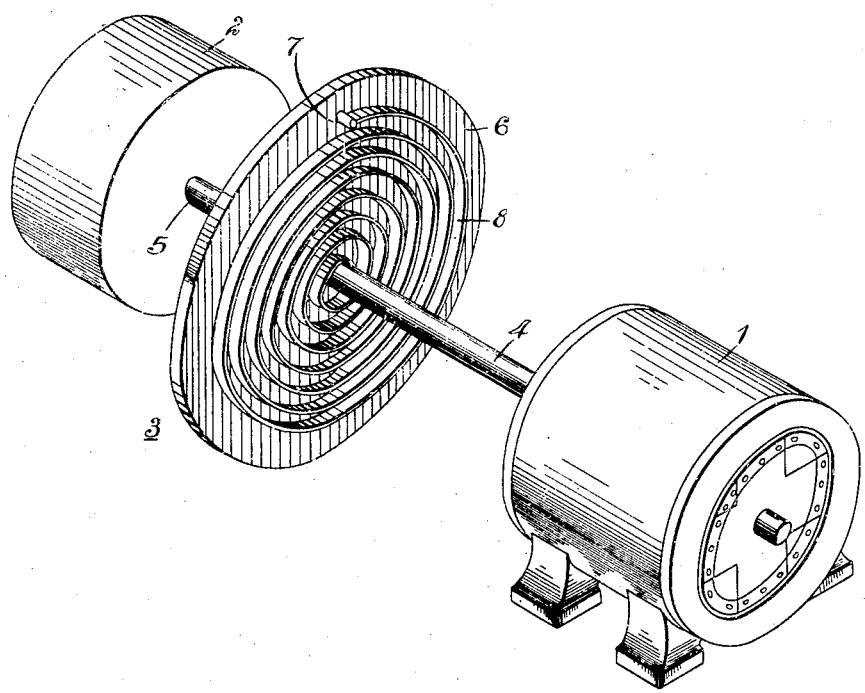
WITNESSES:
INVENTOR
Clifford A. M. Weber.
BY
ATTORNEY Patented Apr. 28, 1925.

1,535,639

UNITED STATES PATENT OFFICE.

CLIFFORD A. M. WEBER, OF EDGEWOOD PARK, PENNSYLVANIA, ASSIGNOR TO WESTINGHOUSE ELECTRIC & MANUFACTURING COMPANY, A CORPORATION OF PENNSYLVANIA.

MEANS FOR OVERCOMING LOAD INERTIA.

Application filed September 16, 1918. Serial No. 254,212.

*To all whom it may concern:*

Be it known that I, CLIFFORD A. M. WEBER, a citizen of the United States, and a resident of Edgewood Park, in the county of Allegheny and State of Pennsylvania, have invented a new and useful Improvement in Means for Overcoming Load Inertia, of which the following is a specification.

My invention relates to means for overcoming the inertia of loads which may be attached to electrical motors, and it has for its object to provide a means whereby a load may be accelerated to the full speed of its associated motor, irrespective of any inertia which the load may possess.

It is a well known fact that a driven load decreases the acceleration and increases the time required for an electrical motor to reach full speed and, in motors of the synchronous type, this is more noticeable, since such motors pull into synchronism rather suddenly and, if the inertia of the load is too great to respond to the sudden increase in speed just before the motor pulls into synchronism, the motor will fail to pull into synchronism.

For example, in the case of a salient-pole synchronous induction motor which pulls into synchronism quite rapidly from its normal induction speed, it is difficult to bring a load which possesses an appreciable inertia up to speed rapidly enough to enable it to be brought into exact synchronism at the same time the motor itself falls into step. Under these conditions, the inertia may be so great that the motor is unable to accelerate the load rapidly enough from the normal induction speed to the synchronous speed although, after the load has been brought up to synchronous speed, the motor is capable of easily maintaining the load at that speed.

The object of my invention, therefore, is to so associate with a salient-pole synchronous induction motor, or any other synchronous motor, and its accompanying load, such means as will enable the motor to properly accelerate the load without incurring the possibility of the load pulling out of step at the point where the motor increase of speed is appreciably more sudden than the load increase of speed. I have found that, by arranging a resilient member, such, for instance, as a spring, between the motor and its associated load, the difficulty above described is overcome and the load may be gradually accelerated to the desired speed, although the speed-change of its driving motor may have been abnormally sudden.

For example, such a device, in connection with an induction motor of the synchronous salient-pole type, will operate in the following manner. The motor brings the load, to which it is connected through a resilient member, up to the normal induction-motor speed for that particular load in the usual manner. When the synchronous induction motor suddenly increases in speed from its induction-motor speed to its synchronous-motor speed, the spring, which is connected between the motor and its load, will be temporarily stressed by the action of this sudden increase in speed of the motor over the speed of the load and, therefore, the load will lag behind the motor an appreciable number of space degrees.

This angular distance which the load lags behind its associated motor will be gradually decreased after the motor has reached synchronism, by reason of the action of the resilient member in decreasing the stress which was set up by the sudden increase from induction-motor speed to synchronous-motor speed.

In this connection, it should be observed that, especially with reference to the salient-pole synchronous induction motor, the amount of torque the motor will pull depends upon the inertia of the load. If the inertia of the load is zero, the motor will pull in the same amount of torque as will pull the motor out of synchronism. If the inertia of the load be now gradually increased, the amount of measurable torque which the motor will pull into synchronism decreases and finally, a point is reached at which the motor will not pull its load into synchronism.

For a better understanding of my invention which is a perspective and partially diagrammatic view of my improved device combined with a motor and its accompanying load, reference may be had to the single figure of the drawing.

I have here shown a motor 1 of any desirable form connected to a load 2 through a resilient member 3, the resilient member 3 being connected to shafts 4 and 5, respectively, of the motor 1 and the load 2. The resilient member 3 comprises a disk 6 which is attached to the axle 5 of the load 2. Extending perpendicularly from the disk 6 is a pin or lug 7 to which is attached one end of a coil spring 8, the other end of which is secured to the shaft 4 of the motor.

It will be observed, therefore, that, in case the load 2 lags any appreciable number of space degrees behind its driving motor, such action causes the spring 8 to be wound up until the motor reaches its high speed. Thereafter, the action of the wound spring will operate to gradually decrease the number of degrees lag, and the load will gradually be brought up to the desired speed.

For purposes of convenience, I have shown the motor 1 as having an end bell removed to show a salient pole induction motor winding.

While I have shown my device as consisting of a spring member and a disk, it is obvious that resilient members having different structural characteristics may be used in this connection, and I do not desire to be limited to the specific form of spring shown since I believe the combination which I have herein illustrated is broadly new in the art.

I desire, therefore, that only such limitations shall be placed upon the device herein described as are imposed by the prior art or are set forth in the appended claim.

I claim as my invention:

The combination with a rotatably mounted load possessing an appreciable inertia, of a driving means therefor, comprising a salient-pole induction motor, and elastic means interposed between said load and said motor, whereby said load is enabled to be accelerated gradually to synchronous speed of said motor although said driving motor accelerates from its induction motor speed to its salient pole speed with great rapidity.

In testimony whereof, I have hereunto subscribed my name this 4th day of Sept. 1918.

CLIFFORD A. M. WEBER.